Patented Aug. 13, 1940

2,211,022

UNITED STATES PATENT OFFICE 2,211,022

HYDROGENATION OF CARBON MONOXIDE

Wilhelm Michael, Ludwigshafen-on-the-Rhine, and Wolfgang Jaeckh, Heidelberg, Germany, assignors, by mesne assignments, to William E. Currie, New York, N. Y.

No Drawing. Application February 19, 1937, Serial No. 126,664. In Germany February 25, 1936

6 Claims. (Cl. 260—449)

The present invention relates to improvements in carrying out reactions of carbon monoxide with hydrogen, in particular to the conversion of these gases into gaseous, liquid and/or solid hydrocarbons or their derivatives containing oxygen.

It has already been proposed to use catalysts comprising more than one substance, the main constituent being metals of the 8th group of the periodic system in the said reactions of carbon monoxide with hydrogen for the preparation of gaseous, liquid and/or solid hydrocarbons (the gaseous hydrocarbons containing more than one carbon atom in the molecule) or their derivatives containing oxygen. Hitherto, such catalysts have usually been prepared by bringing soluble compounds containing the single components into solution together and then subjecting them in this solution to a common further treatment, for example by precipitating the components together from the solution, drying and reducing, or evaporating the solution and then subjecting the residue to a decomposing thermal treatment.

We have now found that catalysts of especially good activity for the said reaction are obtained by precipitating from solutions or suspensions of compounds of the metals of the iron group the said metals in the form of their difficultly soluble or insoluble compounds, adding the further components to the precipitated compounds and then subjecting the resulting mixture to a thermal treatment which is best effected with reducing gases. The procedure may also be that to the precipitated compound of a metal of the iron group there is added the solution of a compound of another metal, the latter then being precipitated in the presence of the first compound. This modification of the preparation according to the present invention is particularly advantageous. It is likewise advantageous to add the compound of another metal to the precipitated compound of the metal of the iron group in the form of a fresh voluminous precipitate which is another form of a dispersion of the added metal compound with water. Probably the good effect is due to the fine distribution of the added metal compound on the surface of the iron metal which is attained by the addition of the said metal compound while dispersed with water.

Of the metals of the iron group, iron itself is of special advantage, but also nickel and cobalt may be employed. It is precipitated, as are the other iron group metals, preferably in the form of a compound containing oxygen which is reducible to metal with hydrogen, as for example as the hydroxide, carbonate, basic acetate or oxalate.

As further components to be added to the aforesaid compounds of the iron group metals may be mentioned for example compounds of aluminum, beryllium, manganese, zinc, thorium, cerium, zirconium and other metals of the rare earths, in particular metals forming oxides which are not reducible to metal with hydrogen at temperatures up to 900° C., and they are preferably employed in the form of compounds which by heating are decomposed with the formation of the oxide, for example the nitrates, carbonates, hydroxides or salts of organic acids. These further compounds may be added in such amounts that the metals building them up are present in the mixture in amounts up to 30 parts by weight, preferably from 0.1 part or still less up to 15 or 20 parts, for each 100 parts of the metal from the iron group.

Compounds of the said metals obtained by precipitation methods, in particular the hydroxides, as for example aluminum hydroxide, may, however, be used with equally good results. The salts of organic acids, as for example aluminum acetate, aluminum oxalate and the like have also proved to be suitable additions. Two or more of the said components may also be added to the catalyst. Thus for example good yields are obtained with catalysts which have been prepared by the addition of aluminum hydroxide and manganese hydroxide to precipitated iron hydroxide.

As a third or further component there may also be used a compound of a metal which forms a readily reducible oxide. Thus for example catalysts which contain not only aluminum nitrate, but also copper nitrate as a second additional substance to precipitated iron hydroxide, also give good yields.

The catalysts provided with the additions are then subjected to a thermal treatment, preferably in the presence of reducing gases, as for example hydrogen, gases containing hydrogen or carbon monoxide. This treatment is preferably carried out at high temperatures ranging between 500° and 1100° C., as for example at 800° C., whereby at least a partial sintering of the catalyst takes place. The thermal treatment may also be carried out in two or more stages, for example by first heating the catalysts in the presence of non-reducing gases, as for example nitrogen or air, and then with reducing gases.

The thermal treatment in one or more stages may take place at atmospheric pressure or at pressures of any value, as for example at 2, 5, 10, 50, 100 atmospheres or more. In some cases, when working in two or more stages, it is also advantageous to use different pressures in the single stages.

The reaction with carbon monoxide and hydrogen is carried out at temperatures above 150°, preferably between 200° and 450° C. The proportions of carbon monoxide and hydrogen may be for example 1:1 (calculated by volume), but this ratio may be varied in favor of hydrogen or carbon monoxide. The hydrocarbon synthesis for which the catalysts prepared according to this invention are of particular advantage may be carried out at any desired pressure. It is preferable, however, to use increased pressure, as for example 5, 10, 20, 50, 100 atmospheres or more.

The following examples will further illustrate the nature of this invention but the invention is not restricted to these examples. The parts are by weight.

Example 1

Iron hydroxide is precipitated and filtered off. A suspension of precipitated aluminum hydroxide is added to the still moist iron hydroxide, the amounts being such that there are 5 per cent of aluminum oxide with respect to metallic iron. The mixture of the hydroxides is then intimately stirred and dried in a drying cabinet and reduced in a stream of hydrogen at 850° C.

If a mixture of equal parts of carbon monoxide and hydrogen be led over the said catalyst at a pressure of 15 atmospheres and at a temperature of 300° C., there are formed, in addition to small amounts of products containing oxygen, mainly liquid hydrocarbons and small amounts of gaseous and solid hydrocarbons. The amount of liquid and solid products obtained per day is equal to the volume of the catalyst used.

If on the other hand the iron hydroxide is precipitated together with the aluminum hydroxide, filtered off and reduced, the yield of liquid and solid products under the same reaction conditions is considerably less. It amounts to only about one quarter of the volume of the catalyst used per day.

Example 2

Precipitated iron hydroxide is made into a paste with an aqueous solution of aluminum nitrate. The aluminum nitrate is added in such an amount that there are 10 per cent of aluminum oxide with respect to metallic iron. The paste is dried in a drying cabinet and treated at 800° C. with hydrogen.

If a mixture of carbon monoxide and hydrogen be led over the catalyst thus prepared under the reaction conditions specified in Example 1, there are obtained in the course of a day about one and a half times the catalyst volume of liquid and solid products.

What we claim is:

1. A process for the thermal conversion of carbon monoxide with hydrogen into organic compounds selected from the group consisting of liquid and solid hydrocarbons and gaseous hydrocarbons containing more than one carbon atom in the molecule which comprises heating the said carbon monoxide and hydrogen in the presence of a catalyst which has been prepared by precipitating from a solution of an iron group metal compound such difficultly soluble or insoluble compound of the said metal as is easily reducible to the metal by heating in the presence of hydrogen, adding to the precipitated compound such compound of another metal as by heating yields an oxide not reducible to metal by hydrogen below 900° C., and subsequently heating the resulting mixture in the presence of a gas having a reducing action to a temperature above 500° C. for a period of time sufficient to effect sintering.

2. In the process as claimed in claim 1, operating in the presence of a catalyst prepared by adding to the precipitated iron group metal compound the other compound in the form of a dispersion with water.

3. In the process as claimed in claim 1, operating in the presence of a catalyst prepared by adding a compound of a metal selected from the group consisting of aluminum, beryllium, manganese, zinc and metals of the rare earths to a precipitated compound of iron which is easily reducible by hydrogen.

4. In the process as claimed in claim 1, operating in the presence of a catalyst prepared by adding precipitated aluminum hydroxide to a precipitated compound of iron which is easily reducible by hydrogen.

5. In the process as claimed in claim 1, operating in the presence of a catalyst prepared by adding a solution of aluminum nitrate to a precipitated compound of iron which is easily reducible by hydrogen, drying the resulting mass and subsequently heating it to a sufficiently high temperature to effect at least partial sintering of the catalyst in the presence of a gas having a reducing action.

6. In the process as claimed in claim 1, operating in the presence of a catalyst prepared by adding a solution of aluminum nitrate to a precipitated compound of iron which is easily reducible by hydrogen, precipitating aluminum hydroxide from the said solution and subsequently heating the mixture of precipitates to a sufficiently high temperature to effect at least partial sintering of the catalyst in the presence of a gas having a reducing action.

WILHELM MICHAEL.
WOLFGANG JAECKH.